Figure 1:
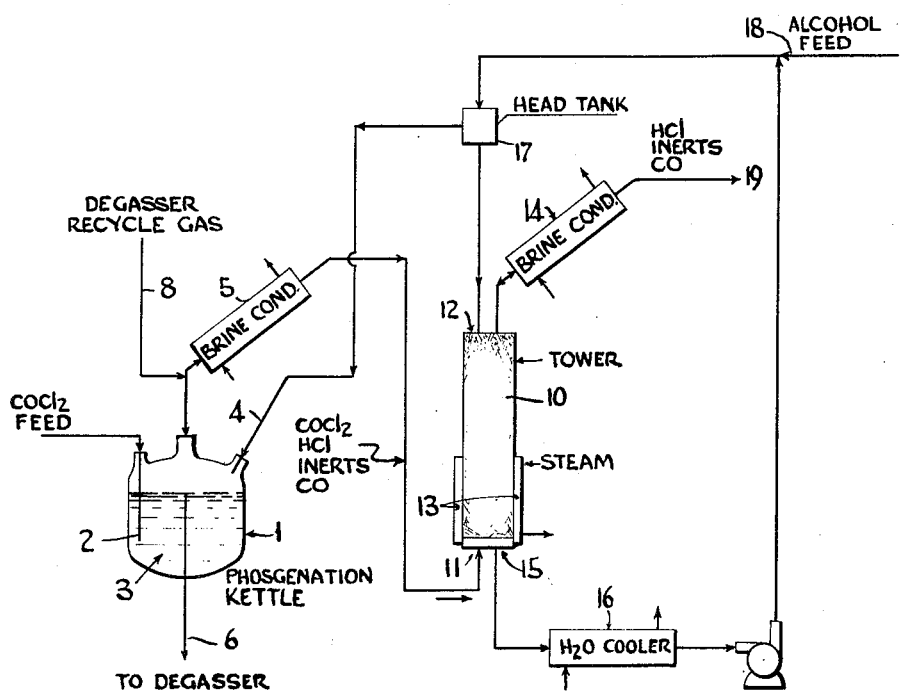

Jan. 22, 1957

F. W. THEIS ET AL 2,778,846

CHLOROFORMATE PRODUCTION

Filed Feb. 26, 1954

INVENTORS
FRANCIS W. THEIS and
KENNETH W. RICHARDSON, Jr.

BY Oscar L. Spencer

ATTORNEY

United States Patent Office 2,778,846
Patented Jan. 22, 1957

2,778,846

CHLOROFORMATE PRODUCTION

Francis W. Theis, Akron, and Kenneth W. Richardson, Jr., Barberton, Ohio, assignors to Columbia-Southern Chemical Corporation Application February 26, 1954, Serial No. 412,712

14 Claims. (Cl. 260—463)

The present invention relates to an improved method for providing chloroformates by reaction of phosgene and an alcohol.

Alcohols may be phosgenated to provide chloroformates, but frequently such reaction is accompanied by formation of undesired carbonates or chlorides. It has been suggested that phosgenation be conducted at temperatures which preclude carbonate or chloride formation. In one process recommended for accomplishing such ends, suitable control of the reaction temperature is provided by vaporizing phosgene whereby the heat of reaction is absorbed. The phosgene vapors are permitted to escape from the reaction zone, preferably to a reflux condenser whereby condensation of the vaporized phosgene is accomplished and phosgene is returned.

Along with phosgene escaping to the reflux condenser are sizeable quantities of hydrogen chloride evolved by the phosgenation reaction, the removal of which is necessary if the reaction is to proceed efficiently. Under such conditions complete condensation of all the vaporized phosgene is not feasible but instead a gaseous mixture of phosgene and hydrogen chloride, frequently containing as much as 20 to 30 mole percent phosgene remains uncondensed and passes as a gas through the condenser and is discarded. Such loss of phosgene is of economic significance.

According to the present invention an improved and novel method is provided for phosgenating alcohols to produce chloroformates whereby the above described loss of phosgene is avoided without encountering substantial chloride or carbonate by-products. In accordance with this invention it has been found that chloroformates, notably those derived from the low-boiling alcohols, may be efficiently produced by providing a system wherein countercurrently flowing streams of phosgene and liquid alcohol are contacted at temperatures conducive to the formation of chloroformates but below those at which substantial carbonate is formed and by withdrawing evolved hydrogen chloride from one end of the countercurrent contact system and product chloroformate from the other end thereof while maintaining the temperature adjacent the chloroformate withdrawal point above that adjacent to point of hydrogen chloride withdrawal. Such countercurrent systems may be provided by recourse to various expedients including a series of appropriately interconnected phosgenation kettles wherein the liquid alcohol, usually along with some reaction product chloroformate, is moved from kettle to kettle countercurrently to the flow of phosgene from kettle to kettle. The kettles at the respective ends of the alcohol and phosgene flow lines are maintained at appropriate temperatures in order to withdraw chloroformate from a medium which is at a temperature higher than that prevailing in the medium from which the evolved hydrogen halide is removed.

An efficient technique for conducting such countercurrent flow which comprises a special preferred embodiment of this invention, involves introducing gaseous phosgene into a gas-liquid contact tower at the low level therein while introducing liquid alcohol at an upper level thereby establishing a zone providing countercurrent contact between a descending liquid alcohol stream and a rising phosgene stream, the temperature in such zone being maintained above that at which phosgene liquifies, e. g. 8° C., and below that which is conducive to substantial carbonate formation, for example below 120° C. Preferably, the range of temperatures within the column is between 10° C. and 90° C. From a point in the upper portion of the contact zone, hydrogen chloride is withdrawn generally as overhead. Product chloroformate is removed from the lower portion of the tower, which portion of the tower is at a temperature above that at which the hydrogen chloride is withdrawn, usually such temperature differential between the respective withdrawal points being from 30° C. to 50° C. Thus, the upper portion of the tower may be maintained at from 30° C. to 40° C. while the lower portion is kept at 70° C. to 80° C. To provide for this temperature differential, the lower portion of the tower is frequently heated by heat transfer from a steam jacket therearound or by other recognized expedients such as steam coils, electrical heating units, and the like.

Inasmuch as the hydrogen chloride is withdrawn generally at those temperatures which low boiling alcohols exert a substantial partial pressure, it is frequently desirable to recover the quantities of alcohol which accompany the hydrogen chloride. To this end, the withdrawn hydrogen chloride is cooled to selectively condense at least a major portion of the gaseous alcohol admixed therewith, such as in a suitable heat exchange apparatus. This condensate may be directly returned to the upper portion of the tower or may be recombined with the alcohol feed. Temperatures on the order of minus 30° C., as provided by brine-cooled condensers, are quite satisfactory, although considerable latitude in temperatures is possible.

The instant invention has particular utility when performed in cooperation with phosgenation processes wherein mixtures of phosgene and hydrogen chloride have heretofore been discarded. Exemplary processes of this character are those described in U. S. Letters Patent 2,476,637 granted July 19, 1949, to Franklin Strain and Wilbert F. Newton. Accordingly, a preferred embodiment of this invention comprises combined utilization of "kettle phosgenation" and gas-liquid tower contact phosgenation to obtain the respective advantages of each. For clarity, Figure I of the accompanying drawing diagrammatically illustrates such embodiment.

In this illustrated system a major portion of all the phosgenation is performed in kettle 1, usually constructed of glass-lined steel or other suitable corrosion resistant material. Based on the total amount of alcohol converted to chloroformate in this combined system, between about 70 to 80% of the reaction is preferably consummated in kettle 1, the balance being performed in tower 10. Performance of the reaction in kettle 1 is preferably accomplished by a process described in U. S. Letters Patent 2,476,637, hereinbefore identified, although any process wherein a gaseous mixture of phosgene and hydrogen chloride is generated and discarded is contemplated.

In initiating the reaction in kettle 1, a pool of the liquid chloroformate to be produced is introduced into or generated in situ in kettle 1. Generation in situ is accomplished by introducing phosgene into the alcohol until the conversion to chloroformate is concluded. Having provided the pool of liquid chloroformate, phosgene either as a liquid or gas is introduced below the liquid level at 2, until a liquid reaction pool of a chloroformate solution of phosgene is provided. When the phosgene concentration in pool 3 is sufficient to cause refluxing of phosgene, addition of alcohol or a mixture of alcohol and the chloroformate from 4 is commenced, either continuously or incrementally along with further feed of phosgene.

Product chloroformate is withdrawn continuously or intermittently at a rate such that pool 3 remains essentially constant in volume by suitable take off means 6. Chloroformates so withdrawn contain a significant concentration of phosgene, the presence of which is often undesirable. Therefore, phosgene is usually removed by air degassing, or by other expedients, especially by recourse to the preferred heat degassing operation described in copending application Serial No. 338,846 filed February 25, 1953, now U. S. Patent No. 2,732,914.

Phosgene which comprises the regular feed to pool 3 often contains limited but measurable quantities of inerts usually those resulting from phosgene generation. Typically, phosgene is produced by the reaction of carbon monoxide and chlorine and thus some carbon monoxide, possibly some carbon dioxide as well as inerts such as nitrogen and neon often constitute a minor portion of the gaseous phosgene introduced into pool 3. On a volume basis, the phosgene usually comprises between 85 and 95% of the feed.

As conversion of alcohol to chloroformate proceeds, phosgene from the solution is vaporized by absorption of a major portion or all of the heat of reaction and this gaseous phosgene escapes through suitable tubing to brine-cooled condenser 5. Along with the vaporized phosgene, the hydrogen chloride evolved as a by-product of the reaction also escapes to brine condenser 5. In this condenser, the gases are cooled to between minus 5° C. and minus 40° C., most frequently about minus 30° C., and a major portion of the gaseous phosgene condenses and is returned to pool 3 as reflux.

A minor, but economically significant amount of phosgene does not condense and a gaseous mixture of phosgene and hydrogen chloride passes through brine condenser 5, and is introduced into the bottom of tower 10 at 11. It will be appreciated that the exact composition of this gaseous mixture may vary widely but typically it contains between 20 and 30 mole percent phosgene based on its phosgene and hydrogen chloride content. Also present will be most of, if not all of the inerts introduced into the system in the phosgene feed, the major constituent of which is generally carbon monoxide.

As diagrammatically indicated, phosgene feed to pool 3 may be affected in a plurality of ways besides direct feed. For example, phosgene requirements of the system may be fulfilled by adding quantities to the refluxing phosgene returning to the system after being condensed in brine condenser 5. At least a portion of such phosgene feed may constitute phosgene recovered from degassing the chloroformate product by expedients hereinbefore described; this phosgene may be added at 8 to refluxing phosgene.

The uncondensed gas mixture containing phosgene, hydrogen chloride plus inerts and carbon monoxide is introduced into a gas-liquid contact tower 10 usually packed with Raschig rings, Berl saddles, or other inert refractory materials of this character which are designed to provide large interfacial areas. Alternatively the tower may constitute a series of bubble caps. Into the top of tower 10 at 12, alcohol along with some chloroformate and hydrogen chloride is introduced as a liquid solution. This provides within the contact zone of tower 10 a descending stream of liquid alcohol along with some chloroformate which counter-currently contacts a rising stream which is introduced at 11 and contains phosgene, hydrogen chloride and inerts including carbon monoxide. The lower portion of tower 10 is surrounded by jacket 13 into which steam or other suitable heat transfer medium is introduced. This results in a bottom tower temperature which is above that at the upper portion of the tower. As will be appreciated, the exact temperatures, and likewise the temperature differential between the hot and cool portions of the tower, may vary considerably depending to a large extent on the nature of the specific alcohol employed as well as other factors.

In the system diagrammatically illustrated in Figure 1, the temperature at the top of the column usually corresponds to that at which phosgenation is conducted in kettle 1. This is so inasmuch as alcohol feed to kettle 1, as will be explained more fully hereinafter, is a separated portion of the feed to tower 10. Temperatures usually employed in phosgenation kettle 1, and hence usually constituting the top temperature of tower 10 range from the temperature at which phosgene is known as a liquid, about 8° C., up to temperatures as high as about 80° C., or under rare circumstances up to about 100° C., precautions being taken to insure that such temperatures are below those which are normally conducive to the formation of substantial quantities of carbonates. Most frequently and preferably this temperature range is from about 15° C. to 50° C.

The temperature differential in tower 10 should be about 30 to 50° C., or under certain conditions within 5° C. of such range. In general, the hottest temperature should not exceed 120° C. and preferably should be below 100° C. Due to the exothermic nature of the reaction, the hottest point in the tower need not necessarily be at the bottom, but may be found between the extremities thereof, such as in the midsection. In a typical operation, the bottom temperature is between 70 and 85° C. and the hot point of tower 10 may be several degrees higher. The coolest portion of the tower usually at the top or where the liquid alcohol is added will be between 30° C. and 40° C. Ideally, hydrogen chloride is removed at this coolest point, although it may be removed at any point which is cooler than the point where liquid is removed from tower 10.

By virtue of this temperature differential established in the column, gaseous hydrogen chloride is driven off as overhead to brine condenser 14 and cooled to between minus 5° C. and minus 40° C., most frequently to minus 30° C. Condensed by this cooling and returned generally to the top of the column is a substantial quantity of the alcohol which is carried over as a gas along with the HCl. Passing through brine condenser 14 and remaining gasses is hydrogen chloride as well as inerts and carbon monoxide. These are removed from the system as at 19. And in the described process as illustrated in Figure 1, this is the point at which the reaction generated hydrogen chloride is removed in order to facilitate continued phosgenation.

From the lower portion of the tower, and more normally as bottoms, a liquid mixture comprising unreacted alcohol and chloroformate of the alcohol as well as dissolved hydrogen chloride is withdrawn at 15, cooled in water cooler 16 and recycled to head tank 17. At 18, the alcohol requirements are added to the recycled bottoms of tower 10. At head tank 17, the alcohol-diluted bottoms are divided with one portion constituting the feed to phosgenation kettle 1, via appropriate tubing at 4. The remaining solution is introduced at 12 into tower 10 to countercurrently contact the gaseous phosgene and hydrogen chloride mixture.

Thus, in the outlined system the alcohol concentration in the alcohol-chloroformate solution introduced at 12 is greater than that removed as bottoms from tower 10, the difference being the amount of alcohol which reacts with the phosgene introduced as gas stream at 11. When first removed as bottoms, the alcohol-chloroformate solution is saturated with hydrogen chloride; however, the alcohol addition at 18 as well as the temperature reduction in water cooler 16 renders such solution unsaturated with respect to hydrogen chloride.

The exact concentration of the chloroformate in the alcohol-chloroformate solution both introduced and removed from tower 10 can be varied considerably while still observing the spirit of this invention. Most frequently the alcohol-chloroformate solution introduced at 12 contains about 12 to 18 mole percent chloroformate based on the chloroformate and alcohol, whereas the bottoms at 15 contain between some 3 and 15 mole percent or more haloformate than does the feed; for example, the chloroformate concentration may range from between 15 to 33 mole percent, preferably 18 to 26 mole percent chloroformate based on alcohol and chloroformate. The relatively small percentage of the total conversion of alcohol to chloroformate occurring in tower 10 is because a major portion of the total reaction both in kettle 1 and tower 2 is preferably conducted in the kettle, usually from 70 to 80 percent of the total chloroformate being intentionally produced in kettle 1.

Besides the preferred dual use of phosgenation kettle and gas-liquid contact tower described in Figure 1, various modifications of such system are possible within the scope of this invention. For example, it is possible to feed a portion of the bottoms of tower 10, with or without cooling, directly to phosgenation kettle 1, rather than recycling in the manner hereinbefore described with further addition of alcohol prior to introduction into the major phosgenation unit.

The particular invention herein described is most effective when utilized in connection with the conversion of low-boiling monohydric normally liquid alcohol, and their respective chloroformates. Those alcohols which comprise a preferred group contain from 1 to 5 carbon atoms and have a normal boiling point below 120° C., and more preferably below 85° C. Alcohols of this character include methanol, ethanol, isopropanol, normal propanol, and tertiary butanol among those boiling below 85° C.; also useful are secondary butanol, isobutanol, normal butanol, some of the amyl alcohols such as pentanol-2,2-methyl-butanol-3, pentanol-3, 2-methyl-butanol-2, 2,2-dimethyl-propanol-1, 2,2-dimethyl-butanol-3 and 2,3-dimethyl-butanol-2, which constitute a secondary preferred group.

The manner in which this invention may be practiced is illustrated in the following examples:

*Example I*

The apparatus included a column which was a four foot section of glass pipe 2 inches in diameter and packed with 44 inches of ¼ inch Berl saddles. Heat was supplied to the lower third of the tower by wrapping an electrical heating wire therearound and connecting its respective ends to a variable resistance, the variable resistance providing means for controlling the wire's electrical heat output. A Dry Ice-acetone trap was connected to the uppermost portion of the column which trap was in turn connected to a caustic trap containing 25 percent by weight of aqueous sodium hydroxide. This caustic was connected to a vacuum which was regulated to maintain the pressure within the tower approximately atmospheric.

Connected to the lowermost portion of the column through appropriate tubing was a product collection bottle which was immersed in a cold bath. Individual cylinders of gaseous phosgene and hydrogen chloride were connected to a common feed inlet at the bottom of the tower.

Isopropyl alcohol, saturated with hydrogen chloride was fed from a feed bottle into the top of the column by gravity until the packing was wet. Then hydrogen chloride and phosgene gas from their respective cylinders were admixed and introduced into the bottom of the column with the electrical heating means operating to supply heat to the lower portion of the tower. As the operation progressed, the bottom section of the column was kept at approximately 75° C. to 80° C.

The respective weights of the feed to the tower as well as the product liquor and gases removed therefrom were all determined by accurately weighing the respective containers before and after the run.

Following the above general procedure, two runs were made at varying conditions. The following tabulations give the pertinent data:

|  | Run 1 | Run 2 |
|---|---|---|
| Isopropanol-hydrogen chloride, liquor temperature, °C | 18.3 | 25.5 |
| Product liquor temperature, °C | 36 | 48.3 |
| Bottom of column, °C | 80 | 80 |
| Middle of column, °C | 80 | 76 |
| Exit gas from column, °C | 24.4–36.1 | 43.3 |
| Top column pressure, absolute | 0 | 0 |
| Duration of run, hours | 2 | 1¼ |

Expressed as gram-moles per hour, the following amounts of materials introduced and removed from the operation were:

|  | Run 1 | Run 2 |
|---|---|---|
| Feed Liquor: |  |  |
|   Isopropanol | 7.240 | 5.870 |
|   HCl | 2.705 | 1.421 |
| Product Liquor: |  |  |
|   Isopropanol | 6.295 | 5.180 |
|   Isopropyl Chloroformate | 0.424 | 0.503 |
|   HCl | 4.555 | 3.472 |
| $COCl_2$ feed | 0.602 | 0.647 |
| HCl feed | 2.725 | 3.285 |
| Dry Ice-Acetone Trap: |  |  |
|   Isopropanol | 0.162 | 0.107 |
|   Isopropyl Chloroformate | 0.018 | 0.023 |
| Caustic Trap: |  |  |
|   HCl | 1.650 | 1.340 |
|   $COCl_2$ | 0.160 | 0.121 |

*Example II*

Using the system diagrammatically illustrated in Figure I of the drawing, 5.26 moles per hour of isopropanol were converted to isopropyl chloroformate. Seventy-three percent of the isopropyl chloroformate was produced by reaction occurring in kettle 1, the balance resulted from reaction taking place in gas-liquor contact tower 10. Phosgenation in kettle 1 was conducted at 32° C. and this was the temperature at which feed was introduced to tower 10 at 12. Brine condensers 5 and 14 cooled the gases to minus 30° C. The temperature at the bottom portion of tower 10 and of the withdrawn bottoms was maintained at between 71° C. and 76° C. Cooler 16 reduced the temperature of the tower bottoms to about 32° C., prior to their recycle to the tower.

In operation, 5.26 moles per hour of phosgene were introduced into established isopropyl chloroformate-phosgene solution 3, while 5.26 moles per hour of isopropyl alcohol were added to the system at 18. Some 1.718 moles of carbon dioxide and about 0.9 inerts accompanied the phosgene entering the system. With approximately 73 percent of the isopropyl alcohol converted to isopropyl chloroformate in kettle 1, the gas which is introduced into the bottom of tower 10 at 11 contains 1.420 moles phosgene per hour, 5.130 moles hydrogen chloride per hour and the inerts in amounts corresponding to their feeds along with the introduced phosgene to kettle 1. Via tubing 4, a solution of 3.84 moles of alcohol, 1.42 moles of isopropyl chloroformate and 1.29 moles of hydrogen chloride per hour was fed to the kettle.

A solution having the same composition as that introduced into kettle 1 is added at 12 to tower 10 packed with Berl saddles; the rates and moles per hour being for isopropyl chloroformate 2.15, for hydrogen chloride 1.955 and for isopropanol 11.07. Removed from the system as gases from condenser 14 are 5.26 moles per hour of hydrogen chloride along with 1.718 moles of carbon monoxide and 0.9 mole of inerts.

Following the above procedure, some 5.2 moles per hour of isopropyl chloroformate are continually removed from kettle 1 by takeoff means 6. This product is freed of phosgene by air degassing and/or heat degassing in accordance with the process described in application Serial No. 338,846. The phosgene recovered in this manner is recycled to the phosgene feed stream.

Although the present invention has been described with respect to certain details of specific embodiments, it is not intended to be limited thereto except insofar as defined in the appended claims.

We claim:

1. A method of preparing a chloroformate which comprises establishing countercurrently flowing streams of phosgene and liquid alcohol, contacting such streams at temperatures conducive to the formation of chloroformate but below that at which substantial carbonate is formed, withdrawing evolved hydrogen chloride from one end of the countercurrent contact system and produced chloroformate from the other end thereof while maintaining the temperature adjacent the chloroformate withdrawal point substantially above that adjacent the point of hydrogen chloride withdrawal.

2. A method of preparing a chloroformate of a normally liquid, low boiling monohydric alcohol which comprises contacting countercurrently flowing streams of gaseous phosgene and normally liquid low boiling monohydric alcohol at a temperature conducive to the formation of a chloroformate but below that at which substantial carbonate is formed, withdrawing evolved hydrogen chloride gas from one end of the countercurrent contact system and produced chloroformate from the other end thereof and maintaining the temperature adjacent the chloroformate withdrawal point substantially above that adjacent the point of hydrogen chloride withdrawal.

3. The method of claim 2 wherein the streams are in contact at a temperature above the normal boiling point of phosgene and below about 120° C.

4. The method of claim 2 wherein the temperature differential is from 30° C. to 50° C. between that adjacent the point of withdrawal of chloroformate and the point of withdrawal of the hydrogen chloride.

5. A method of preparing a chloroformate which comprises introducing gaseous phosgene into a gas-liquid contact tower at a low level therein, adding a liquid stream of alcohol to said tower above the point of phosgene introduction whereby to establish a zone of countercurrent contact between liquid alcohol and phosgene, maintaining the temperature of the zone above that at which phosgene normally liquifies and below that at which substantial carbonate is formed, withdrawing gaseous hydrogen chloride from a point in the upper portion of the zone, and withdrawing chloroformate from the lower portion of the tower, said lower portion of the tower being at a temperature between 30° C. and 50° C. above the temperature in the tower at the point at which the hydrogen chloride is removed.

6. A method of preparing a chloroformate of a normally liquid, low boiling monohydric alcohol which comprises introducing gaseous phosgene into a gas-liquid contact tower at a low level therein, adding the alcohol corresponding to said chloroformate to the tower above the point of phosgene introduction whereby to establish a zone of countercurrent contact between the liquid and gas phases, the rate of alcohol introduction being sufficient to provide a stoichiometric excess of alcohol in said zone, maintaining the temperature of the zone above the normal boiling point of phosgene and below 120° C., withdrawing gaseous hydrogen chloride from a point in the upper portion of the tower, and withdrawing an alcohol-chloroformate mixture from the lower portion of the tower, said lower portion of the tower being at a temperature 30° C. to 50° C. above the temperature of the tower at the point at which the hydrogen chloride is removed.

7. A method of preparing a chloroformate of a normally liquid, low boiling monohydric alcohol which comprises introducing a gaseous mixture of phosgene and hydrogen chloride into a gas-liquid contact tower at a low level therein, adding a liquid alcohol-chloroformate mixture to said tower above the point of gas introduction whereby to establish a zone of countercurrent contact between the liquid and gas phases, the rate of alcohol introduction being sufficient to provide a stoichiometric excess of alcohol in the zone, maintaining the temperature of the zone above about 8° C. and below a temperature at which substantial carbonate is formed, withdrawing gaseous hydrogen chloride as an overhead, withdrawing a liquid alcohol-chloroformate mixture richer in chloroformate than the feed to the upper portion of the tower from the lower portion of the tower, said lower portion of the tower being at a temperature above that at which the alcohol-chloroformate mixture is introduced to the upper portion of the tower and at which the hydrogen chloride is withdrawn.

8. The method of claim 7 wherein the withdrawn gaseous hydrogen chloride is cooled to condense the vapors of alcohol escaping therewith and said alcohol is returned to the upper portion of the contact tower.

9. A method for preparing a chloroformate which comprises reacting an alcohol and phosgene in liquid medium, feeding alcohol and phosgene to the medium while the reaction is occurring, permitting phosgene and hydrogen chloride to vaporize and escape from the reaction medium, contacting at least a portion of said vaporized gaseous mixture of phosgene and hydrogen chloride with the alcohol feed prior to its addition to the reaction medium by passing the gaseous mixture countercurrently through the liquid alcohol feed stream at a temperature conducive to the reaction of the phosgene and alcohol whereby to convert a substantial portion of the phosgene and to form chloroformate and below that temperature at which carbonates are provided in substantial amounts.

10. A method of preparing a chloroformate which comprises establishing a solution of phosgene in a liquid chloroformate, adding an alcohol corresponding to the chloroformate and phosgene to the solution with consequent formation of chloroformate and evolution of heat of reaction, permitting vaporization of phosgene whereby to absorb said evolved heat, allowing at least a portion of said vaporized phosgene to escape from the system along with evolved hydrogen chloride, countercurrently contacting said escaping gaseous mixture of phosgene and hydrogen chloride with the alcohol prior to its introduction into the solution under conditions conducive to the formation of a chloroformate by reaction of the phosgene with the alcohol whereby to convert a substantial portion of the phosgene to chloroformate.

11. A method of preparing a chloroformate of an alcohol which reacts with phosgene to form a chloroformate which comprises establishing a solution of phosgene in a liquid chloroformate, adding an alcohol corresponding to the chloroformate and phosgene to the solution with consequent formation of chloroformate and evolution of heat of reaction, permitting vaporization of sufficient phosgene to absorb at least a portion of said evolved heat, allowing at least a portion of the vaporized gaseous mixture of phosgene and evolved hydrogen chloride to escape from the reaction system and scrubbing said phosgene containing gas with the alcohol prior to addition thereof to the solution, effecting said scrubbing by introducing the gaseous mixture into a gas-liquid contact tower at a low level therein, introducing said alcohol to said tower above the point of gas introduction whereby to establish a zone of countercurrent contact between the liquid and gas phases, the rate of alcohol introduction being sufficient to provide a stoichiometric excess of alcohol, maintaining the temperature of the zone above that at which phosgene liquifies and below that at which substantial carbonate is formed, withdrawing gaseous hydrogen chloride from a point in the upper portion of said tower and withdrawing a liquid alcohol-chloroformate mixture from the lower portion of the tower which lower portion is at a temperature substantially above that at which the hydrogen chloride is withdrawn and adding at least a portion of said withdrawn liquid alcohol-chloroformate mixture to the solution of phosgene and liquid chloroformate.

12. A method of preparing a chloroformate of a low boiling, normally liquid monohydric alcohol which reacts with phosgene to form a chloroformate which comprises establishing a solution of phosgene in a liquid chloroformate, adding alcohol and phosgene to the solution with consequent formation of chloroformate and evolution of heat of reaction, permitting vaporization of phosgene whereby to absorb at least a portion of said evolved heat, maintaining the phosgene concentration sufficiently low to prevent the temperature of the solution from falling below 10° C. and sufficiently high to prevent the temperature of solution from exceeding 100° C., removing a gaseous phosgene-hydrogen chloride mixture from the solution and introducing it into a gas-liquid contact tower at a low level therein, adding a liquid stream of said alcohol prior to introduction into said solution to said tower above the point of gas introduction whereby to establish a zone of countercurrent contact between the liquid and gas phases, the rate of alcohol introduction being sufficient to provide a stoichiometric excess of alcohol, maintaining the temperature of the zone above that at which phosgene normally boils and below 120° C., withdrawing gaseous hydrogen chloride from a point in the upper portion of the tower, withdrawing a liquid alcohol-chloroformate mixture from the lower portion of the tower, said lower portion of the tower being at a temperature substantially above that at which the hydrogen chloride is withdrawn in said tower, adding additional alcohol to said withdrawn tower mixture and adding at least a portion of said resulting chloroformate-alcohol solution to the solution of phosgene in liquid chloroformate.

13. The method of claim 12 wherein the alcohol is isopropanol and the chloroformate isopropyl chloroformate.

14. The method of claim 12 wherein the lower tower temperature at the point of alcohol-chloroformate withdrawal is 30° C. to 50° C. higher than the tower temperature at the point of hydrogen chloride withdrawal.

References Cited in the file of this patent
UNITED STATES PATENTS

| | | |
|---|---|---|
| 1,603,689 | Hammond | Oct. 19, 1926 |
| 2,476,637 | Strain | July 19, 1949 |